(12) United States Patent
Endo et al.

(10) Patent No.: US 10,662,882 B2
(45) Date of Patent: May 26, 2020

(54) FUEL PRESSURE MONITORING SYSTEM OF VAPORIZER

(71) Applicant: NIKKI CO., LTD., Kanagawa-ken (JP)

(72) Inventors: Takayuki Endo, Kanagawa-ken (JP); Tsutomu Murakami, Kanagawa-ken (JP); Tomoaki Fukuoka, Kanagawa-ken (JP)

(73) Assignee: Nikki Co., Ltd. (JP)

( * ) Notice: Subject to any disclaimer, the term of this patent is extended or adjusted under 35 U.S.C. 154(b) by 0 days.

(21) Appl. No.: 16/246,188

(22) Filed: Jan. 11, 2019

(65) Prior Publication Data
US 2019/0211756 A1 Jul. 11, 2019

(30) Foreign Application Priority Data

Jan. 11, 2018 (JP) .................................. 2018-002855

(51) Int. Cl.
| | | |
|---|---|---|
| F02D 19/00 | (2006.01) | |
| F02M 21/00 | (2006.01) | |
| F02D 19/06 | (2006.01) | |
| F02D 19/02 | (2006.01) | |
| F02M 21/02 | (2006.01) | |
| F02D 41/00 | (2006.01) | |

(52) U.S. Cl.
CPC ....... *F02D 19/0647* (2013.01); *F02D 19/022* (2013.01); *F02D 19/024* (2013.01); *F02D 19/027* (2013.01); *F02M 21/0239* (2013.01); *F02D 19/025* (2013.01); *F02D 41/0027* (2013.01); *F02D 2200/0602* (2013.01)

(58) Field of Classification Search
CPC .... F02D 19/025; F02D 19/026; F02D 19/027; F02D 19/0647; F02D 19/0671; F02D 41/0027; F02D 2200/0602; F02M 21/0239; F02M 21/0242
See application file for complete search history.

(56) References Cited

U.S. PATENT DOCUMENTS 5,483,943 A * 1/1996 Peters ................ F02M 21/0239
 123/527
6,142,128 A * 11/2000 Gobbi ..................... F02B 43/00
 123/527

(Continued)

FOREIGN PATENT DOCUMENTS

JP 2008-19819 A 1/2008

OTHER PUBLICATIONS

English abstract for JP-2008-19819.

*Primary Examiner* — Thomas N Moulis
(74) *Attorney, Agent, or Firm* — Fishmant Stewart PLLC

(57) ABSTRACT

Provided is a fuel pressure monitoring system of a vaporizer using a safety module which issues a fault signal by detecting a pressure using a fuel pressure sensor disposed in a pressure regulating chamber of the vaporizer within a predetermined time after an engine is stopped and determining that the pressure regulating mechanism fails when the detected pressure exceeds a threshold stored in a storage device to be increased to a predetermined pressure or higher, and the pressure regulating mechanism is determined to fail only when a water temperature of cooling water in the engine of the vaporizer reaches a predetermined temperature at which warming up of the engine can be determined to be completed.

7 Claims, 2 Drawing Sheets

(56) References Cited

U.S. PATENT DOCUMENTS

| | | | | |
|---|---|---|---|---|
| 6,957,637 | B2* | 10/2005 | Lin | F02B 43/10 |
| | | | | 123/184.53 |
| 8,516,998 | B2* | 8/2013 | Long | F02M 21/0233 |
| | | | | 123/527 |
| 9,850,845 | B2* | 12/2017 | Sloan | G01F 23/18 |
| 2001/0003977 | A1* | 6/2001 | Hayashi | F02D 41/0027 |
| | | | | 123/480 |
| 2005/0061297 | A1* | 3/2005 | Oono | F02D 33/006 |
| | | | | 123/458 |
| 2005/0087177 | A1* | 4/2005 | Kang | F02D 41/027 |
| | | | | 123/491 |
| 2011/0166769 | A1* | 7/2011 | Buechler | F02D 23/00 |
| | | | | 701/103 |
| 2015/0053180 | A1* | 2/2015 | Pursifull | F02M 21/0284 |
| | | | | 123/445 |
| 2015/0219044 | A1* | 8/2015 | Melanson | F02G 5/04 |
| | | | | 60/710 |

* cited by examiner

FUEL PRESSURE MONITORING SYSTEM OF VAPORIZER

CROSS-REFERENCE TO RELATED APPLICATION

This application claims priority to Japanese Application JP 2018-002855 filed on Jan. 11, 2018, the contents of which are hereby incorporated by reference in its entirety.

TECHNICAL FIELD

The present invention relates to a fuel pressure monitoring system of a vaporizer which includes a regulator monitoring abnormality in a fuel pressure in a pressure regulating chamber caused by not closing a pressure regulating valve due to a defect of a pressure regulating mechanism which is a component of vaporizer supplying a gas phase fuel regulated to a predetermined pressure from an injector to an engine by vaporizing a liquid phase LPG fuel stored in a tank into the gas phase fuel and introducing the gas phase fuel into the pressure regulating chamber from an LPG fuel passage via the pressure regulating valve opening and closing with the predetermined pressure, and more particularly, to a vaporizer being warmed by heat from cooling water in the engine to vaporize a liquid phase LPG fuel.

BACKGROUND

Conventionally, for example, JP 2008-19819 A and the like disclose that in an engine using LPG as a fuel, a vaporizer including a regulator vaporizes a liquid phase LPG fuel stored in a tank into a gas phase fuel by using heat of an engine cooling water, and introduces the high-pressure gas phase fuel into a pressure regulating chamber via a pressure regulating mechanism using a pressure regulating valve opening and closing with a predetermined pressure to allow an injector to supply the gas phase fuel regulated to the predetermined pressure to the engine.

FIG. 1 shows an example of a vaporizer 1 as disclosed in the above-mentioned publication. Here, an LPG fuel passage 4 through which a high-pressure liquid phase LPG fuel stored in a tank (not shown) passes is disposed along an engine cooling water passage 3 formed in a body 2 and is connected to a pressure regulating chamber 6 via a pressure regulating valve 5 attached to the LPG fuel passage 4, the pressure regulating valve 5 is constituted by a valve body 8 which closely contacts with and shuts a valve seat 7 provided on an opening portion to the LPG fuel passage 4 of the pressure regulating chamber 6, one end of a valve lever 12 is connected to a central part of a diaphragm 11 having a compression coil spring 10 partitioning the pressure regulating chamber 6 and a back pressure chamber 9, and the other end of the valve lever 12 is shaft-supported on the valve body 8 by a shaft pin 13, thereby configuring a lever type pressure regulating chamber.

In the conventional vaporizer 1, if a pressure on a downstream side is decreased by delivering the gas phase LPG fuel in the pressure regulating chamber 6 according to the driving of the engine, the diaphragm 11 is displaced to the pressure regulating chamber 6 side to operate the valve lever 12 so that the valve body 8 is lifted to open a valve, thereby introducing the high-pressure gas phase LPG fuel into the pressure regulating chamber 6 and increasing an internal pressure to a predetermined fuel pressure, and a micro opening of the pressure regulating valve 5 is adjusted to reduce the pressure in the pressure regulating chamber 6 to a required pressure and the injector (not shown) supplies the pressure regulated fuel gas to the engine, under a balance between the diaphragm 11 applied with the pressure of the high-pressure LPG fuel vaporized in the LPG fuel passage 4 and the compression coil spring 10 opposite thereto by the engine cooling water 15 flowing through the engine cooling water passage 3 formed in the body 2 and heated by the driving of the engine.

However, if malfunction, damage, or the like related to the pressure regulating mechanism, such as the pressure regulating valve 5, the valve seat 7, the diaphragm 11, and the valve lever 12 occurs, the normal function of the pressure regulating valve becomes impaired. In particular, impurities that adversely affect rubber parts are contained in a large amount in an LPG fuel depending on a production area, and there is a possibility that a rubber portion of the pressure regulating valve 5 in the vaporizer 1 is damaged and thus leading to breakage.

As described above, if the pressure regulating valve 5 fails to close due to a defect of the pressure regulating mechanism as a component of the vaporizer 1, the high-pressure gas phase fuel is supplied to the pressure regulating chamber 6 even after the engine is stopped, and the pressure of the gas phase fuel in the pressure regulating chamber 6 is likely to be abnormally increased. For this reason, the pressure regulating chamber 6 is normally provided with a safety valve 14 constituted by a relief valve. For example, as disclosed in JP 7-23624 Y, a fuel pressure monitoring system of a vaporizer using "safety module" guided to a safe place such as a closed cross-sectional space of a vehicle body by operating a safety valve has been adopted.

In this specification, the "safety module" is referred to as a device for realizing a control of "operating a machine only when safety can be confirmed" in a control system related to safety, and specifically, is referred to as a device for receiving a signal from an "input unit" such as an emergency stop switch or a safety switch to determine whether it is safe or not, and transmitting the signal to an "output unit" such as a contactor based on the determination result.

SUMMARY

However, in the conventional fuel pressure monitoring system of a vaporizer as described above, the abnormal pressure in the pressure regulating chamber 6 can be detected by monitoring a fuel outlet pressure, but since it is also considered that the pressure in the pressure regulating chamber 6 may become an abnormal pressure due to the increase in the pressure in the pressure regulating chamber 6 according to the introduction of the liquid phase fuel into the pressure regulating chamber in the low temperature state or the acceleration state inherent to the liquid phase LPG fuel, there is a problem in that the failure of the pressure regulating mechanism cannot be detected only by the pressure monitoring.

A fuel pressure monitoring system of a vaporizer according to the present invention has been made to solve the above problems, and there is provided a fuel pressure monitoring system of a vaporizer using a safety module, in which in the vaporizer which vaporizes a liquid phase LPG fuel stored in a tank into a gas phase fuel by using heat of an engine cooling water and introduces the gas phase fuel into a pressure regulating chamber via a pressure regulating mechanism to allow an injector to supply the gas phase fuel regulated to a predetermined pressure to an engine, the fuel pressure monitoring system of the vaporizer uses the safety module which issues a fault signal by determining that a pressure regulating mechanism fails when a fuel pressure sensor disposed in the pressure regulating chamber of the vaporizer detects a pressure within a predetermined time after the engine is stopped to determine that the detected pressure exceeds a threshold stored in a storage device to be increased to the predetermined pressure or higher, and the pressure regulating mechanism is determined to fail only when a water temperature of cooling water in the engine of the vaporizer reaches a predetermined temperature at which warming up of the engine can be determined to be completed.

In particular, the pressure regulating mechanism includes a diaphragm displaced by a pressure in the pressure regulating chamber, a coil spring energizing the diaphragm toward the pressure regulating chamber, and a pressure regulating valve interlocked with the diaphragm by a valve lever and disposed between the LPG fuel passage and the pressure regulating chamber, and in the vaporizer which vaporizes a liquid phase LPG fuel stored in a tank into a gas phase fuel by using heat of an engine cooling water and introduces the gas phase fuel into the pressure regulating chamber via the pressure regulating valve opening and closing with a predetermined pressure and allows an injector to supply the gas phase fuel regulated to the predetermined pressure to the engine, the pressure is detected by a fuel pressure sensor disposed in the pressure regulating chamber of the vaporizer within a predetermined time after the engine is stopped and when it is determined that the detected pressure exceeds a threshold stored in the storage device to be increased to a predetermined pressure or higher, if the pressure regulating valve is not closed due to a defect of each of the components, the pressure regulating mechanism fails.

In addition, according to the present invention, when the water temperature of the cooling water in the engine of the vaporizer does not reach a predetermined temperature, after the engine is stopped, the pressure in the pressure regulating chamber is not detected, and thus it can be determined that the pressure regulating valve cannot be closed due to the failure of each of the components only when the water temperature of the cooling water in the engine of the vaporizer reaches the predetermined temperature.

After the engine is stopped, if it is determined that the pressure regulating valve cannot be closed due to the failure of the respective components when the water temperature of the cooling water in the engine of the vaporizer reaches the predetermined temperature, the determination is stored in a storage device and power is not supplied to an engine system, thereby securing the safety.

According to the present invention, by detecting the pressure by the fuel pressure sensor disposed in the pressure chamber in the pressure regulating chamber of the vaporizer after the engine is stopped, it is possible to provide the fuel pressure monitoring system of the vaporizer which can reliably detect that the pressure regulating valve cannot be closed due to the failure of each component for introducing the gas phase fuel into the pressure regulating chamber.

DETAILED DESCRIPTION

Hereinafter, modes for carrying out the present invention will be described with reference to the accompanying drawings.

Figure 1:
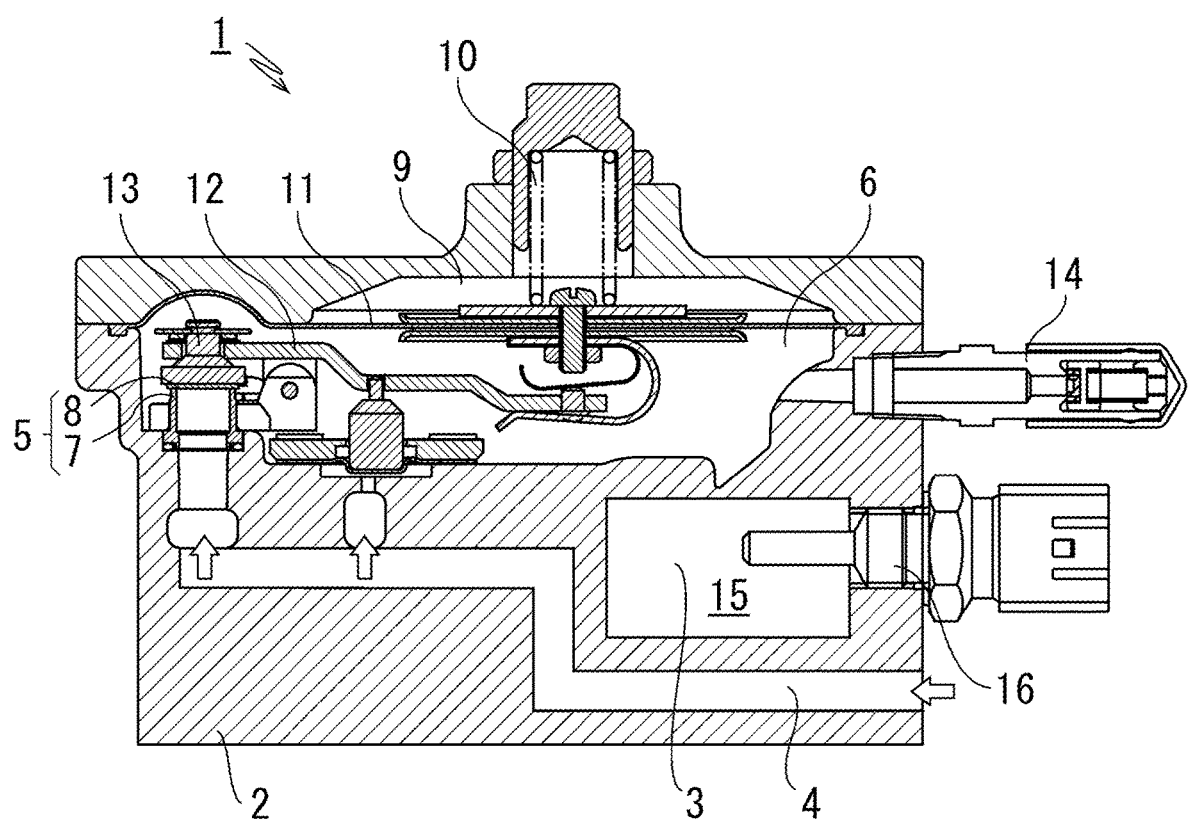
FIG. 1 is a cross-sectional view showing an embodiment of a vaporizer of the present invention and a conventional example.

A vaporizer used in the present embodiment can be the same as the conventional example shown in FIG. 1, and a detailed description thereof will be omitted. The vaporizer includes a vaporization and pressure regulating function of a liquid phase LPG fuel which vaporizes a liquid phase LPG fuel stored in a tank into a gas phase fuel by a heat exchanger performing vaporization using heat from engine cooling water, and introduces the gas phase fuel into a pressure regulating chamber via a pressure regulating valve opening and closing with a predetermined pressure to regulate the gas phase fuel and supply the regulated gas phase fuel to an injector. In particular, the vaporizer includes a water temperature sensor 16 which detects water temperature of an engine cooling water 15 flowing into a portion of an engine cooling water passage 3 of a body 2.

Figure 2:
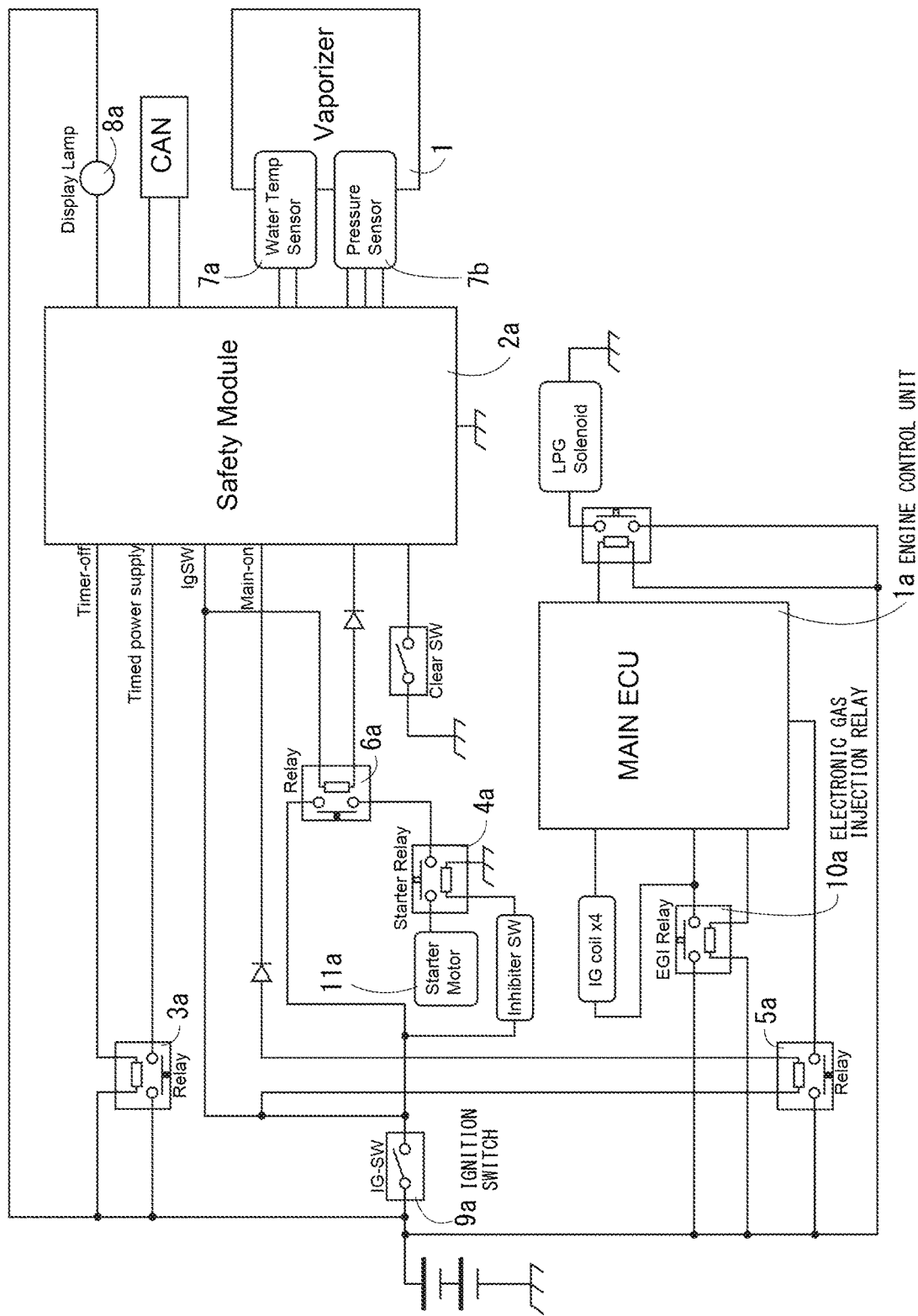
FIG. 2 is a block circuit diagram showing a preferred embodiment of the present invention.

FIG. 2 is a block circuit diagram showing a preferred embodiment of the present invention. An engine control unit (MAIN ECU) 1a for controlling a system of the engine and a safety module 2a for performing a failure determination in the present invention are used as a control device.

In addition, a relay 3a for self-holding of a power supply of the safety module 2a, a relay 5a, and a relay 6a for cutting off a supply of power to the engine control unit (MAIN ECU) 1a and a starter relay 4a after the safety module 2a is determined to be faulty are disposed.

In addition, a water temperature sensor 7a of cooling water, a fuel pressure sensor 7b, in the engine disposed in the vaporizer 1 of the configuration shown in FIG. 1, and a display lamp 8a for displaying a failure state are connected to the safety module 2a.

In the present embodiment having such a configuration, after an ignition switch (IG-SW) 9a is turned on, power is supplied to the safety module 2a and power is supplied to the relay 3a, such that a power supply self-holding circuit is operated.

Thereafter, the safety module 2a confirms a failure determination history stored in a storage device (not shown), and if there is no failure determination history, power is supplied to the relay 5a and the relay 6a.

When power is supplied to the relay 5a and the relay 6a, power is supplied to the starter relay 4a and an electronic gas injection relay (EGI relay) 10a, and a starter motor 11a and the engine control unit (MAIN ECU) 1a are operated.

In the present embodiment, when it is confirmed that the temperature of the engine cooling water 15 in the engine is equal to or higher than a predetermined water temperature by a detection signal from the water temperature sensor 7a (reference numeral 16 shown in FIG. 1) of the vaporizer 1, that is, when the detection signal is transmitted from the water temperature sensor 7a (reference numeral 16 shown in FIG. 1), the detection signal indicating that the temperature of the engine cooling water 15 flowing in the engine cooling water passage 3 of the vaporizer 1 shown in FIG. 1 has reached a temperature (hereinafter referred to as "predetermined temperature") at which it can be determined that warming up of the engine is completed, if the ignition switch (IG-SW) 9a is turned off, the safety module 2a monitors the increase in the pressure in the pressure regulating chamber 6 of the vaporizer 1 shown in FIG. 1 by a fuel pressure sensor 7b, stores the failure determination history in a storage device (not shown) if the pressure exceeds a threshold stored in advance within a predetermined time (for example, 2 minutes) after the engine is stopped, and cuts off the supply of power to the relay 3a for the self-holding of the power supply of the safety module 2a.

In addition, in the present embodiment, when it is confirmed from the detection signal of the predetermined water temperature sensor 7a that the water temperature is equal to or lower than the water temperature of the cooling water in the engine, if the ignition switch (IG-SW) 9a is turned off, the safety module 2a does not detect the increase in the pressure in the pressure regulating chamber 6 of the vaporizer 1 and thus does not monitor the increase in the pressure, and cuts off the supply of power supplied to the relay 3a for the self-holding of the power supply.

When the ignition switch (IG-SW) 9a is turned on next time, since the relay 5a and the relay 6a for cutting off the supply of power to the engine control unit (MAIN ECU) 1a and the starter relay 4a are not supplied with power in the case in which the failure determination history is recorded in the storage device (not shown) of the safety module 2a, the display lamp 8a disposed on, for example, a dash board or the like provided on a driver's seat in a vehicle and displaying that these devices are not operated and are faulty is turned on.

As described above, in the present embodiment, even when the fuel pressure in the pressure regulating chamber 6 of the vaporizer 1 is abnormally increased, the case in which the pressure in the pressure regulating chamber becomes the abnormal pressure due to the increase in the pressure in the pressure regulating chamber according to the introduction of the liquid phase LPG fuel into the pressure regulating chamber in the low temperature state or the acceleration state inherent to the liquid phase LPG fuel is excluded from these situations, and it is certainly determined that the pressure regulating mechanism of the vaporizer 1 as shown in FIG. 1 clearly fails and the pressure regulating valve 5 is abnormal, thereby securing the safety.

What is claimed is:

1. A fuel pressure monitoring system, comprising:
    a vaporizer including a pressure regulating chamber in fluid communication with a fuel passage of an engine, a fuel pressure sensor disposed in the pressure regulating chamber, and a pressure regulating mechanism, wherein in the vaporizer is configured to vaporize a liquid phase LPG fuel stored in a tank into a gas phase fuel by using heat of a cooling water of the engine, and introduce the gas phase fuel from the fuel passage into the pressure regulating chamber via the pressure regulating mechanism to allow an injector of the engine to supply the gas phase fuel regulated to a predetermined pressure to the engine; and
    a safety module with a storage device, wherein the safety module is configured to issue a fault signal by determining that the pressure regulating mechanism fails when the fuel pressure sensor disposed in the pressure regulating chamber of the vaporizer detects a pressure to determine that the detected pressure exceeds a threshold stored in the storage device and has increased to a predetermined pressure or higher, and determine that the pressure regulating mechanism fails only when a water temperature of cooling water in the engine of the vaporizer reaches a predetermined temperature at which warming up of the engine is determined to be completed within a predetermined time after the engine is stopped.

2. The fuel pressure monitoring system of the vaporizer according to claim 1, wherein the pressure regulating mechanism comprises components including a diaphragm displaced by a pressure in the pressure regulating chamber, a coil spring energizing the diaphragm toward the pressure regulating chamber, and a pressure regulating valve interlocked with the diaphragm by a valve lever and disposed between the fuel passage and the pressure regulating chamber, and if the pressure regulating valve is not closed due to a defect of each of the components, the pressure regulating mechanism is determined to fail.

3. The fuel pressure monitoring system of the vaporizer according to claim 1, wherein when the water temperature of the cooling water in the engine of the vaporizer does not reach a predetermined temperature, after the engine is stopped, the pressure in the pressure regulating chamber is not detected.

4. The fuel pressure monitoring system of the vaporizer according to claim 1, wherein after the engine is stopped, if it is determined that the pressure regulating mechanism fails when the water temperature of the cooling water in the engine of the vaporizer reaches the predetermined temperature, the determination is stored in the storage device and power is not supplied to an engine system of the engine.

5. The fuel pressure monitoring system of the vaporizer according to claim 2, wherein when the water temperature of the cooling water in the engine of the vaporizer does not reach a predetermined temperature, after the engine is stopped, the pressure in the pressure regulating chamber is not detected.

6. The fuel pressure monitoring system of the vaporizer according to claim 2, wherein after the engine is stopped, if it is determined that the pressure regulating mechanism fails when the water temperature of the cooling water in the engine of the vaporizer reaches the predetermined temperature, the determination is stored in the storage device and power is not supplied to an engine system of the engine.

7. The fuel pressure monitoring system of the vaporizer according to claim 3, wherein after the engine is stopped, if it is determined that the pressure regulating mechanism fails when the water temperature of the cooling water in the engine of the vaporizer reaches the predetermined temperature, the determination is stored in the storage device and power is not supplied to an engine system of the engine.

* * * * *